(12) United States Patent
Hashimoto et al.

(10) Patent No.: US 8,183,492 B2
(45) Date of Patent: May 22, 2012

(54) POWER SUPPLY CIRCUIT FOR WIRE ELECTRIC DISCHARGE MACHINING APPARATUS

(75) Inventors: Takashi Hashimoto, Tokyo (JP); Koichiro Hattori, Tokyo (JP); Yoshikazu Ukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1278 days.

(21) Appl. No.: 11/909,111

(22) PCT Filed: Oct. 19, 2006

(86) PCT No.: PCT/JP2006/320848
§ 371 (c)(1),
(2), (4) Date: Sep. 19, 2007

(87) PCT Pub. No.: WO2008/047440
PCT Pub. Date: Apr. 24, 2008

(65) Prior Publication Data
US 2009/0230092 A1    Sep. 17, 2009

(51) Int. Cl.
*B23H 7/04* (2006.01)
*B23H 1/02* (2006.01)
(52) U.S. Cl. .................................. 219/69.12; 219/69.13
(58) Field of Classification Search ............... 219/69.12, 219/69.13, 69.18
See application file for complete search history.

(56) References Cited

U.S. PATENT DOCUMENTS

| | | | | |
|---|---|---|---|---|
| 4,491,713 A * | 1/1985 | Patton et al. | | 219/69.13 |
| 4,652,717 A * | 3/1987 | Briffod et al. | | 219/69.12 |
| 2004/0124182 A1 * | 7/2004 | Liang et al. | | 219/69.12 |
| 2005/0145603 A1 * | 7/2005 | Goto et al. | | 219/69.12 |
| 2007/0163999 A1 * | 7/2007 | Jaques et al. | | 219/69.12 |

FOREIGN PATENT DOCUMENTS

| JP | 59-47123 A | 3/1984 |
|---|---|---|
| JP | 61-95826 A | 5/1986 |

* cited by examiner

*Primary Examiner* — Geoffrey S Evans
(74) *Attorney, Agent, or Firm* — Sughrue Mion, PLLC

(57) ABSTRACT

A power supply circuit for a wire electric discharge machining apparatus includes an auxiliary power supply (3) for generating an auxiliary discharge by applying a voltage between a workpiece (2) and a wire electrode (1); and a plurality of main power supplies (4 and 5), a first one of which electrically connected to an upper terminal block (9) for connecting to an upper electrical supply point (6) and a second one of which electrically connected to a lower terminal block (11) for connecting to a lower electrical supply point (7), in order to supply a main discharging current after the auxiliary discharge has occurred; wherein the power supply for the wire electric discharge machining apparatus controls the auxiliary power supply (3) and the plurality of main power supplies (4 and 5), to machine the workpiece (2), and a first end of the auxiliary power supply is connected to the upper terminal block (9) and a second end thereof to the lower terminal block (11).

20 Claims, 6 Drawing Sheets

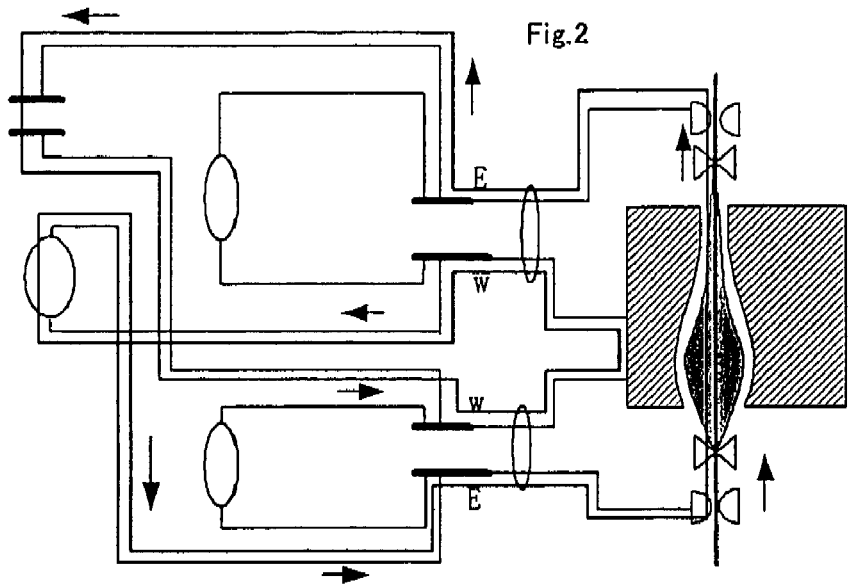
(A) Charging loop path extending from auxiliary power supply (first power supply) to inter-pole gap, and to capacitor
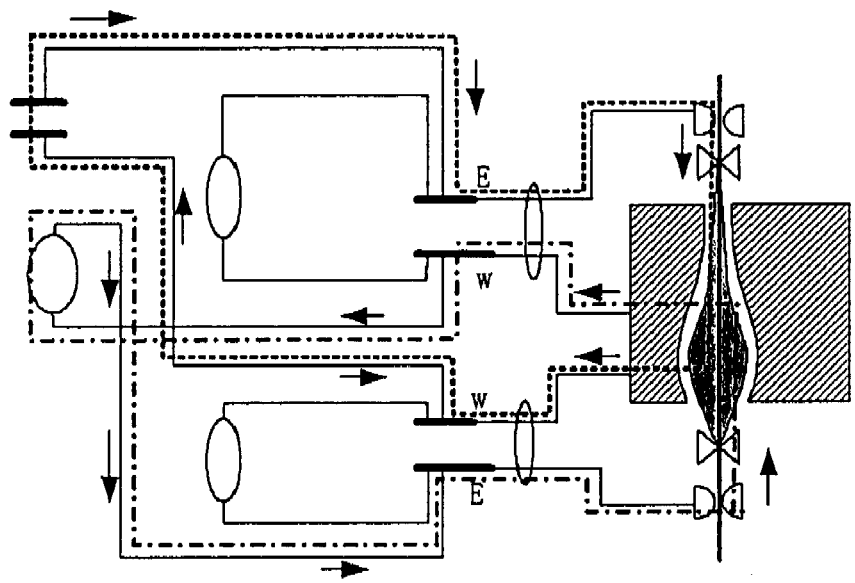
(B) Charging loop path extending from auxiliary power supply to inter-pole gap and charging loop path extending from capacitor to inter-pole gap

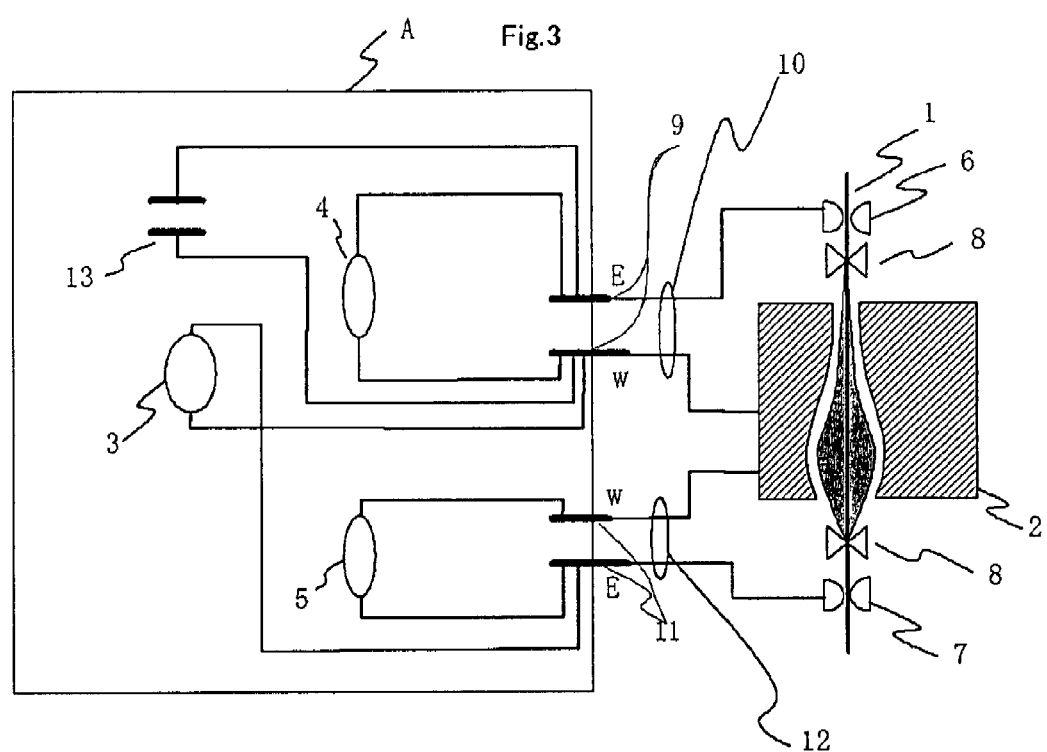

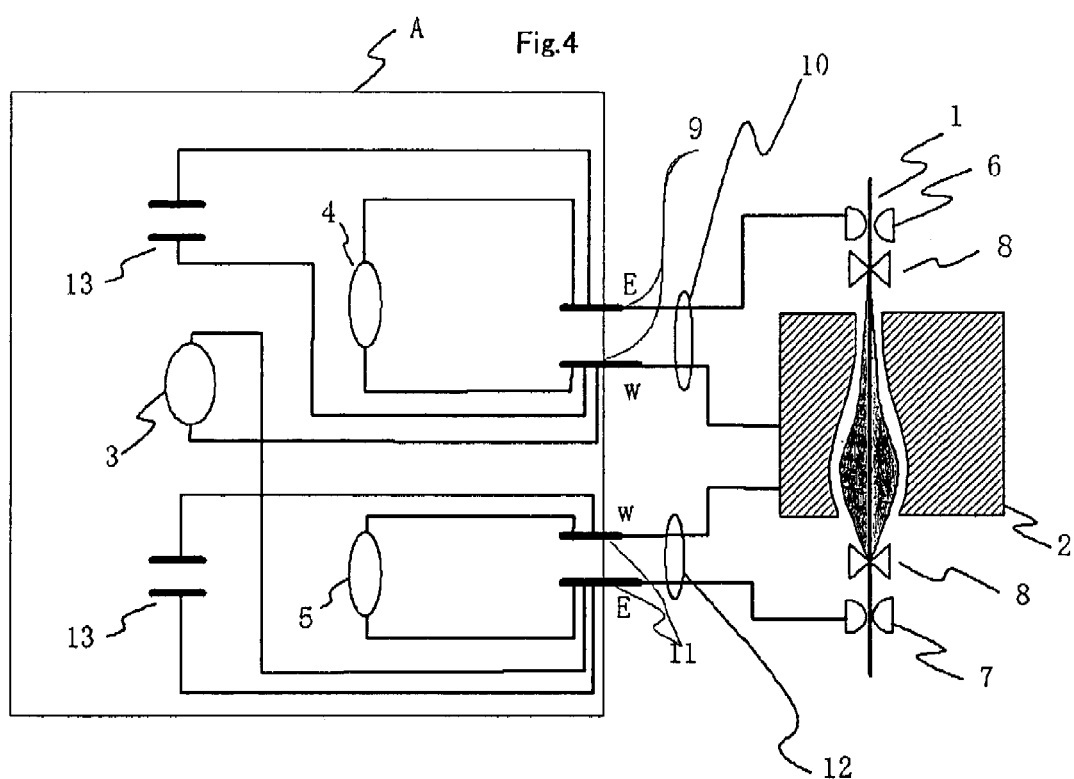

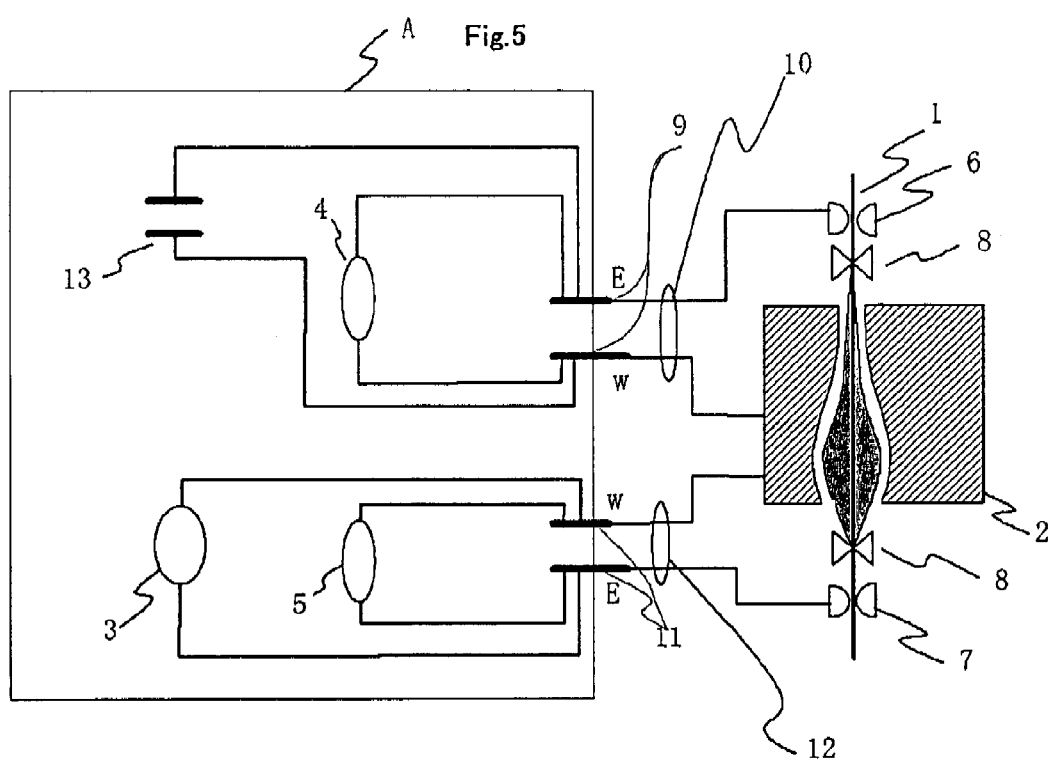

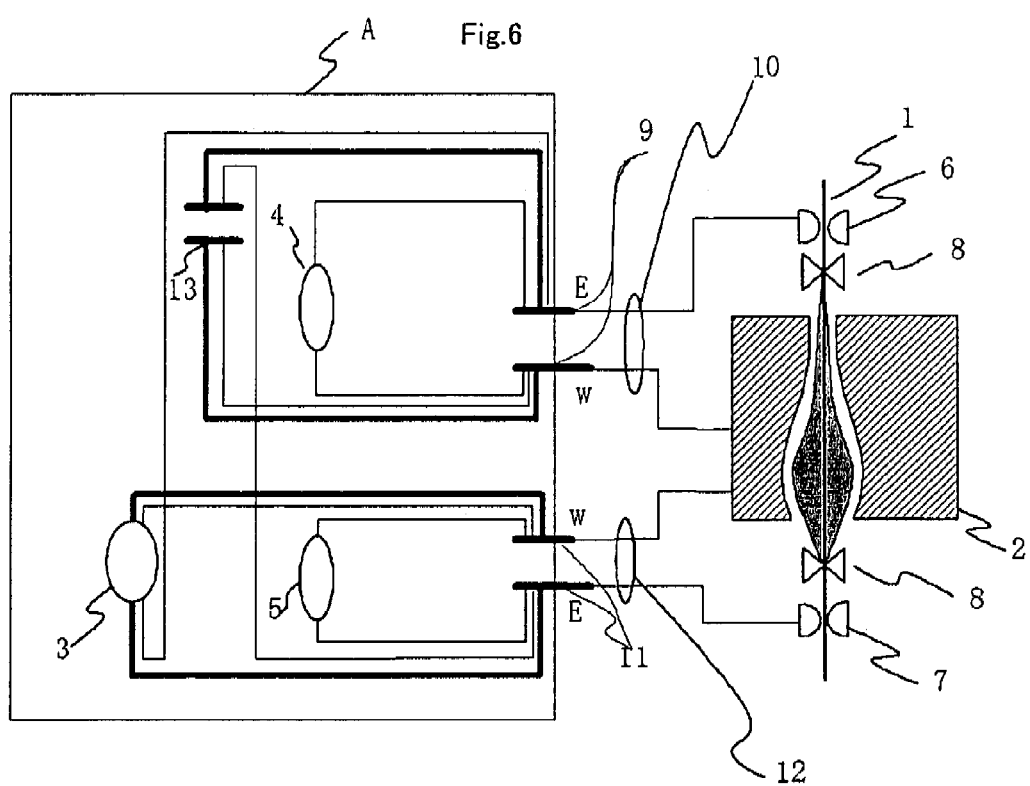

POWER SUPPLY CIRCUIT FOR WIRE ELECTRIC DISCHARGE MACHINING APPARATUS

TECHNICAL FIELD

The present invention relates to power supply circuits for wire electric discharge machining apparatuses, and more particularly to wiring methods for machining-power-supplies formed by a combination of at least two types of power supplies, a main power supply and an auxiliary power supply.

BACKGROUND ART

Wire electric discharge machining apparatuses, which machine a workpiece using arc-discharges occurring between a wire and the workpiece, are provided typically in an upper position and a lower position relative to the workpiece, with electrical supply points (current-carrying terminals) from which power is to be supplied to the wire; thus, there exist two parallel circuits: a first one and a second one at the upper and the lower portions of the wire, respectively. A power supply is constituted of two circuits: an auxiliary power supply circuit (an auxiliary electric discharging power supply) for inducing a low-current spark; and a main power supply circuit (a main electric discharging power supply) for supplying a high current that turns out to be a machining current after the spark has occurred.

One of problems associated with wire discharge machining apparatuses is to perform high speed operations in rough machining. Simply stated, increasing machining electrical energy serves the purpose of achieving high speed machining operations. This leads, however, to wire breakage due to concentrated discharges in which discharges occur at one particular part of the wire. As a technique to avoid this concentrated discharge, for instance, Patent Document 1 discloses a technique in which a main power supply is independently connected to the upper electrical supply point and the lower electrical supply point; switching between these two power supply paths leads to discharge positions being made to differ, thereby making it hard for the concentrated discharges to occur. In addition, Patent Document 2 discloses an example configuration using a main power supply circuit and an auxiliary power supply circuit. The auxiliary power supply is connected though a diode (an ng element) to the upper and lower electrical supply points. A ratio of shunt currents that flow through these points determines an electric discharge position, and a power supply is switched from the main power supply, accordingly.

Patent Document 1
Japanese Unexamined Patent Application Publication S59-47123
Patent Document 2
Japanese Unexamined Patent Application Publication S61-95826

DISCLOSURE OF THE INVENTION

Problems that the Invention is to Solve

As is disclosed in Patent Documents 1 and 2, the concentrated discharges are avoided by connecting the main power supply circuit to each of the two electrical supply points, to supply the power from either the upper electrical supply point or the lower electrical supply point, as may be required, wherein typically, an auxiliary power supply circuit including that in Patent Document 2 generates spark discharge (auxiliary discharge). The spark discharge has no capability of circumventing the concentrated discharges and simply induces the discharges, as well as continuously leads to a current flow of subsequent main discharges. When a small amount of the auxiliary discharging current flows, before the main discharging current is supplied, the auxiliary electric discharge current is interrupted (which is referred to as "partial discharge," "arc shortage," etc.), whereby high-voltage main voltage pulses are directly applied across an inter-electrode gap, to cause possible wire breakage. In light of this, preferably, the auxiliary power supply circuit supplies the power from two places: the upper and lower electrical supply points. However, a current supplied from the main power supply circuit is likely to flow into the inter-electrode gap via the auxiliary power supply circuit. For example, even though the main power supply circuit connected to the upper electrical supply point is turned on and the other main power supply circuit connected to the lower electrical supply point is turned off, a machining current will flow from the upper electrical supply point, via the auxiliary power supply circuit, to the lower electrical supply point. This leads to the machining current being supplied from not only the upper electrical supply point but also the lower electrical supply point to the inter-electrode gap, and there is no possibility of obtaining advantages as disclosed in Patent Documents 1 and 2. It should be noted in this specification that such a phenomenon in which a main current that is to be supplied only from the upper (lower) electrical supply point is supplied additionally from the lower (upper) electrical supply point, is represented as "main power supply independence is not maintained."

In order to prevent this from occurring, each diode (ng element), as indicated in Patent Document 2, have to be interposed between the upper electrical supply point and the auxiliary power supply circuit, and between the lower electrical supply point and the auxiliary power supply circuit so that the main discharging current is prevented from being supplied into the auxiliary power supply circuit. Alternatively, with a circuit including up to the diode (the ng element) being regarded as the auxiliary power supply circuit, there has been a need for a device such that the main power current does not flow into the auxiliary circuit by independently providing the auxiliary power supply circuit for the upper electrical supply point and the auxiliary power supply circuit for the lower electrical supply point, to thereby eliminate the auxiliary power supply circuits from interfering with each other. Stated another way, a problem has been that a component count in the auxiliary power supply circuit, or the circuit size increases.

With respect to the foregoing problem, the present invention is directed to constitute, with the main power supply independence being maintained, the auxiliary power supply circuit having a low component count and being small in size.

Means for Solving the Problem

A power supply circuit for a wire electric discharge machining apparatus according to the present invention comprises an auxiliary power supply for generating an auxiliary discharge by applying a voltage across a workpiece and a wire electrode; a plurality of main power supplies, a first one of which is electrically connected to an upper terminal block for connecting to an upper electrical supply point, and a second one of which is electrically connected to a lower terminal block for connecting to a lower electrical supply point, in order to supply a main discharging current after an auxiliary discharge has occurred; wherein the power supply for the wire electric discharge machining apparatus controls the auxiliary power supply and the main power supply, to machine the workpiece, and a first output end and a second output end of the auxiliary power supply are connected to the upper terminal block and the lower terminal block, respectively.

Effects of the Invention

According to this invention, in an electric discharge machining power supply constituted of one auxiliary power supply circuit and two main power supply circuits (a first end and a second end are connected to an upper electrical supply point and an lower electrical supply point, respectively), the main discharging current supplied from the first electrical supply point will not be outputted from the second electrical supply point to the inter-electrode gap; with the independence of each electrical supply point being maintained, the generation of the auxiliary discharge at any position induces a preliminary discharge that is uniform and steady, which allows stable machining operations to be performed.

BRIEF DESCRIPTION OF DRAWINGS

FIG. 2 is a diagram descriptive of a current flow;

FIG. 3 is a diagram descriptive of an overall configuration of a wire electric discharge machining apparatus shown in Embodiment 2;

FIG. 4 is a diagram descriptive of another example of an overall configuration of the wire electric discharge machining apparatus;

FIG. 5 is a diagram descriptive of an overall configuration of a wire electric discharge machining apparatus shown in Embodiment 3; and FIG. 6 is a diagram descriptive of an overall configuration of a wire electric discharge machining apparatus shown in Embodiment 4.

BEST MODE FOR CARRYING OUT THE INVENTION

Embodiment 1

Figure 1:
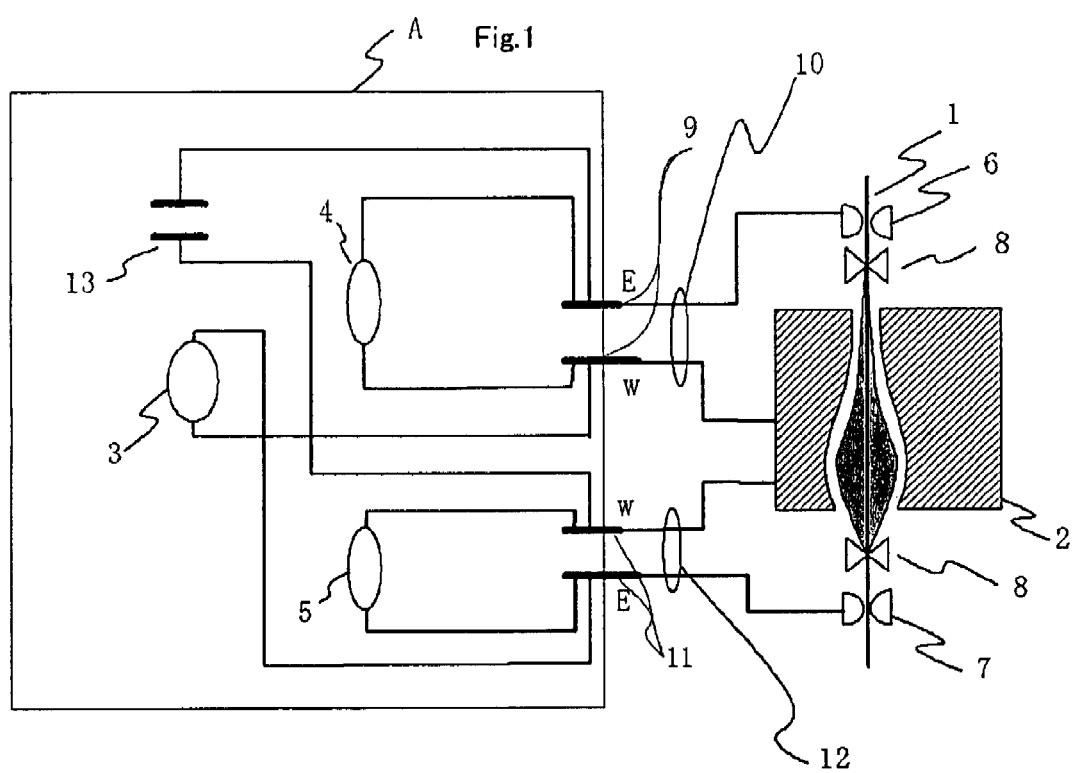
FIG. 1 is a diagram descriptive of an overall configuration of a wire electric discharge machining apparatus shown in Embodiment 1.

FIG. 1 is a diagram illustrating a wire electric discharge machining apparatus that is to be described in this embodiment. Referring to FIG. 1, a wire electrode is indicated at 1; a workpiece, at 2. An auxiliary electric discharging power supply, indicated at 3, passes discharge current pulses across a machining gap (an inter-electrode gap) between the wire electrode 1 and the workpiece 2, to apply a comparatively low voltage across the inter-electrode gap for the purpose of primarily detecting an inter-electrode gap state. An upper main electric discharging power supply, indicated at 4, is connected to an electrical supply point 6 present in an area above the workpiece 2, to primarily supply across the inter-electrode gap a machining current with a relatively higher voltage as compared with an auxiliary electric discharging power supply. In a similar way, a lower main power supply, indicated at 5, is connected to an electrical supply point 7 present in an area below the workpiece 2. An upper terminal block on the power supply circuit side, indicated at 9, connects the power supply to the upper electrical supply point 6. Similarly, a lower terminal block on the power supply circuit side, indicated at 11, connects the power supply to the lower electrical supply point 7. An upper feeder and a lower feeder, indicated at 10 and 12, connect the upper terminal block 9 to the upper electrical supply point 6 and the lower terminal block 11 to the lower electrical supply point 7, respectively. An auxiliary capacitor, indicated at 13, has much larger capacitance than inter-electrode gap capacitance; and a wire guide is indicated at 7. In addition, a power supply case A accommodates the auxiliary power supply 3, the upper main electric discharging power supply 4, the lower main electric discharging power supply 5, and the auxiliary capacitor 13. The upper terminal block 9 and the lower terminal block 11 are configured as output ends of the power supply case A.

Inter-electrode gap stray capacitance varies, depending on an apparatus configuration, to a great extent—on the order of 10 pf (picofarads) through 1 nf (nanofarad). It is preferable that capacitance of the auxiliary capacitor 13 be some 10 to 100 times, the inter-electrode gap stray capacitance, i.e., approximately 100 pf through 100 nf. Here, a problem will be that excessively small capacitance causes a current supplied from the capacitor to be small when the discharge current flows, therefore machining operations tend to be inaccurate; meanwhile, excessively large capacitance causes charge time to the capacitor to be excessively long; consequently, pulses tend to be hard to apply across the inter-electrode gap (the rising edge of each voltage pulse delays).

A feature of this embodiment pertains to methods of connection of the auxiliary capacitor 13, the auxiliary electric discharging power supply 3, the upper main electric discharging power supply 4, and the lower main electric discharging power supply 5 to the upper terminal block 9, and the lower terminal block 11, as will be described in detail below. It should be noted that in the present invention, of the upper terminal block 9 and the lower terminal block 11, first terminals connected to the upper electrical supply point 6 and the lower electrical supply point 7 from which power is supplied to the wire electrode 1, are referred to as E side terminals; second terminals connected to the workpiece 2, as W side terminals.

First of all, positive and negative outputs of the upper main power supply 4 are connected to the E and W sides of the upper terminal block 9, respectively. Next, positive and negative outputs of the lower main power supply 5 are connected to the E and W sides of the lower terminal block 11, respectively. Here, a low-impedance configuration would be more advantageous to machining operations because such a configuration allows the main power supply to supply in a short time a large amount of the main discharging current. Thus, for example, such a configuration in which the main power supply circuit is provided with the terminal block (or directly connected using a copper strip) is more preferable than wiring connection between the output ends and the terminal blocks in the power supply circuit.

The output ends of the auxiliary electric discharging power supply 3 are separately connected to the E side of the lower terminal block 11 and the W side of the upper terminal block 9. The output ends of the auxiliary capacitor 13 are separately connected to the W side of the lower terminal block 11 and the E side of the upper terminal block 9. These wiring connections could be reversely performed: the output ends of the auxiliary electric discharging power supply 3 may be independently connected to the W side of the lower terminal block 11 and the E side of the upper terminal block 9; each of the output ends of the auxiliary capacitor 13, to the E side of the lower terminal block 11 and the W side of the upper terminal block 9.

In the power supply case A, when the auxiliary electric discharging power supply 3 and the auxiliary capacitor 13 are configured by separate units, their output ends and the terminal blocks may be inter-connected by wiring. The mount of the auxiliary discharging current is smaller in comparison with the amount of the main discharging current, and machining operations is less affected even in a slightly higher impedance configuration. For this reason, the copper strip or the like does not have to be particularly utilized to directly connect such output terminals to the terminal blocks. However, the auxiliary capacitor 13 and the auxiliary electric discharging power supply 3 turned out to be a supply source that supplies the auxiliary discharging current from the upper electrical supply point 6 and the lower electrical supply point 7, as will be described hereinafter. Thus, a significant mismatch between wire impedance of wiring associated with the capacitor 13 and that with the power supply 3 would cause also the auxiliary discharging current to vary largely at the upper and lower points. Consequently, the wire impedance for two wiring paths—specifically stated, the wire lengths—should be at a comparable level (preferably, three times or less).

FIG. 2 is a diagram descriptive of a preliminary discharging operation according to this wiring method. As is not illustrated in the figure, there exists in the power supply case A, a type of ng means for controlling power delivery from the auxiliary electric discharging power supply 3, the upper main electric discharging power supply 4, and the lower main electric discharging power supply 5; the control means turns on and off their switching means according to a given time, to thereby apply pulsed voltages. First, as is depicted in FIG. 2a, the voltage pulses are outputted only from the auxiliary electric discharging power supply 3. With this, the current charges the auxiliary capacitor along a loop path extending from the auxiliary electric discharging power supply 3 to the E side of the lower terminal block 11 to the lower electrical supply point 7 to the wire electrode 1 to the upper electrical supply point 6 to the E side of the upper terminal block 9 to the auxiliary capacitor 13 to the W side of the lower terminal block 11 to the workpiece 2 to the W side of the upper terminal block 9, and then back to the auxiliary electric discharging power supply 3. In addition, the current charges the inter-electrode gap capacitance formed between the wire electrode and the workpiece 2.

Here, the spark discharge across the inter-electrode gap is assumed to occur, i.e., a gap between the wire electrode and the workpiece 2 is rendered conductive. At this moment, as is depicted in FIG. 2b, the auxiliary discharging current from the auxiliary electric discharging power supply 3 flows from the lower electrical supply point, as with the foregoing charging loop path, along a loop path extending from the auxiliary electric discharging power supply 3 to the E side of the lower terminal block 11 to the lower electrical supply point 7 to the wire electrode 1 to the workpiece 2 to the W side of the upper terminal block 9, and then back to the auxiliary electric discharging power supply 3. In addition, the auxiliary capacitor 13 functions to cause electric energy stored in the foregoing charging path to discharge; i.e., the auxiliary discharging current to flow from the upper electrical supply point along a loop path extending from the auxiliary capacitor 13 to the E side of the upper terminal block 9 to the upper electrical supply point 6 to the workpiece 2 to the W side of the lower terminal block 11, and then back to the auxiliary capacitor 13. According to the auxiliary power supply circuit configuration that has been described in this embodiment, the auxiliary electric discharging power supply 3 is configured by only one unit; however, an auxiliary discharging current substantially uniformly flows to the upper electrical supply point via the auxiliary capacitor 13, and to the lower electrical supply point via the auxiliary capacitor 3. Thus, discharges at any discharging position enable a substantially uniform current to be supplied, whereby stable machining operations can be performed.

In addition, the auxiliary discharging current flows through, as a loop, the upper and lower feeders, such as the E side of the upper feeder and the W side of the lower feeder, or the W side of the upper feeder and the E side of the lower feeder. The feeders, because of being the loop path that feeds the main current, typically employ low impedance conductors such as coaxial cables. Even though there exists, for instance, impedance unbalance due to differences in number, length and type of upper/lower feeders, the impedance unbalance will not affect stable machining operations by supplying the auxiliary discharging current via each of the upper and lower feeders. Stated another way, an impedance relationship between the inter-electrode gap and the auxiliary discharging power supply, as viewed from the upper main electric discharging power supply, is equal to that between the inter-electrode gap and the lower discharging power supply, as viewed from the lower main electric discharging power supply. This is independent of the presence or absence of the auxiliary capacitor 13. Accordingly, even if the auxiliary capacitor 13 is unused, a uniform auxiliary discharging current can be supplied without depending on the operation of the main electric discharging power supply. That is to say, this embodiment shows an example configured of the auxiliary capacitor 13 that is assumed as a second auxiliary power supply. The foregoing impedance relationships can be established without using the auxiliary capacitor 13. As a result, a uniform auxiliary discharging current can be obtained that is not affected by asymmetry in the main discharge power supplies and the feeder wiring. However, the auxiliary discharging current in this case will be supplied only from one of the electrical supply points.

Next, the main discharges will be described. Immediately after the spark discharge occurs, the main discharging current, subsequent to the auxiliary discharging current, is supplied from the upper main electric discharging power supply 4 and/or the lower main electric discharging power supply 5. Consider, for example, a case where only the upper main electric discharging power supply 4 applies voltage pulses, to feed a machining current. The machining current flows through a loop path extending from the upper main electric discharging power supply 4 to the W side of the upper terminal block 9 to the workpiece 2 to the wire electrode 1 to the E side of the upper terminal block 9, and then back to the upper main electric discharging power supply 4. Since, at this moment, there exist the auxiliary electric discharging power supply 3 and the auxiliary capacitor 13 in series between the upper terminal block 9 and the lower terminal block 11, voltage pulses outputted from the upper terminal block 9 do not appear at the lower terminal block 11; namely, the main power supply independence can be maintained in each unit.

Consequently, by using, e.g., the upper main electric discharging power supply 4 and the lower main electric discharging power supply 5, switching between the upper and lower generation of the main discharges after generation of the auxiliary discharges allows switchover between the main power supplies, thereby reducing concentrated discharges. As a matter of course, polarities of the auxiliary and main discharge voltages are arbitrarily selected. This embodiment shows an example, and a current flow direction may be opposite to the foregoing (reverse polarity across the inter-electrode gap). It should be noted that, as is apparent from FIG. 1, the W sides of the upper terminal block 9 and the lower terminal block 11 are isopotential via the workpiece 2; thus, both terminal blocks may be electrically connected in common; more specifically, the respective W sides of the terminal blocks may be jointed in common using a piece of copper strip. Furthermore, a circuit is often configured, in general, by electrically grounding the workpiece 2. Forming a powerful ground pattern enables a ground reference potential to be stabilized, and control circuits and the like to be designed to be noise-immune.

Embodiment 2

FIG. 3 is a diagram illustrating a wire electric discharge machining apparatus that is to be described in this embodiment. The present embodiment, in particular, features a wiring of the auxiliary capacitor 13 in the power supply case A. The first and second ends of the auxiliary capacitor 13 are connected to the E and W sides of the upper terminal block 9, respectively. This will charge the auxiliary capacitor 13 by way of a loop path extending from the auxiliary electric discharging power supply 3 to the E side of the lower terminal block 11 to the lower electrical supply point 7 to the wire electrode 1 to the upper electrical supply point 6 to the E side of the upper terminal block 9 to the auxiliary capacitor 13 to the W side of the upper terminal block 9, and then back to the auxiliary electric discharging power supply 3.

Then, in the generation of the spark discharge, an auxiliary discharging current is supplied along a loop path extending from the auxiliary capacitor 13 to the E side of the upper terminal block 9 to the upper electrical supply point 6 to the wire electrode 1 to the workpiece 2 to the W side of the upper terminal block 9, and then back to the auxiliary capacitor 13. As a matter of course, the auxiliary electric discharging power supply 3 also supplies in parallel an auxiliary discharging current along a loop path extending from the auxiliary electric discharging power supply 3 to the E side of the lower terminal block 11 to the lower electrical supply point 7 to the wire electrode 1 to the workpiece 2 to the W side of the upper terminal block 9, and then back to the auxiliary electric discharging power supply 3.

This causes the auxiliary discharging current to flow from the upper and lower electrical supply points, therefore allowing a uniform auxiliary discharging current to be supplied independent of discharge positions as is the same case with Embodiment 1; thus, stable machining operations can be achieved. Moreover, since there is the auxiliary electric discharging power supply 3 being interposed in series between the upper terminal block 9 and the lower terminal block 11, the main electric discharging power supply independence can be maintained as is the case with Embodiment 1. Since in wiring in Embodiment 1, wire impedance with respect to the auxiliary discharging current supplied from the auxiliary electric discharging power supply 3 is substantially equal to that with respect to the auxiliary discharging current supplied from the auxiliary capacitor 13, it may be conceivable that the auxiliary discharging current becomes less variable and more uniform than that in Embodiment 2. On the other hand, however, because in the present Embodiment 2 the auxiliary discharging current supplied from the auxiliary capacitor 13 flows by way of only one of the feeders, it may be conceivable that a low impedance path is established. Considering, particularly, that the feeder 10 is constituted of a coaxial cable, its inductance component is extremely small, which leads to stable machining operations because the auxiliary discharging current is supplied more rapidly after starting of a spark discharge than that in Embodiment 1.

It should be noted that as is the case with Embodiment 1, the auxiliary electric discharging power supply 3 may be reversely connected (reverse connection between the E and W sides) to the upper terminal block 9, and the lower terminal block 11. In addition, the polarity (current direction) of the applied pulses is arbitrarily selected, as is the same case with Embodiment 1. Furthermore, not only may one auxiliary capacitor be provided, but also two auxiliary capacitors. Although in this embodiment, one auxiliary capacitor is connected to the upper terminal block 9, two auxiliary capacitors may be used: one being connected to the upper terminal block 9 and the other to the lower terminal block 11, as is depicted in FIG. 4. In this case, two loop paths that are mutually equal and shortest in length, extending from the upper and lower terminal blocks, are established, which therefore allows the auxiliary discharging current independent of spark generating positions to be supplied rapidly after the spark has started, thus enabling partial discharges to be prevented and stable machining operations to be performed.

It may be assumed that the auxiliary capacitor is a discrete element such as, for instance, a film capacitor and does not need to necessarily be an electrical element. The auxiliary capacitor may be replaced with any component/part that serves as a capacitor including, e.g., a coaxial cable, which holds true for every auxiliary capacitor in not limited to this embodiment, but the entire specification.

Embodiment 3

FIG. 5 is a diagram depicting a wire electric discharge machining apparatus that is to be described in this embodiment. In the embodiment, the auxiliary electric discharging power supply 3 is connected to the lower terminal block 11, being connected in parallel with the lower main electric discharging power supply 5. Then, the auxiliary capacitor 13 is connected to the upper terminal block 9 so as to be in parallel with the upper main electric discharging power supply 4. As a matter of course, this configuration may be reversed, i.e., the auxiliary electric discharging power supply 3 may be connected to the upper terminal block 9 and the auxiliary capacitor 13 to the terminal block 11.

With such wiring installed, when the auxiliary electric discharging power supply 3 supplies voltage pulses, the auxiliary capacitor undergoes charging along a loop path extending from the auxiliary electric discharging power supply 3 to the E side of the lower terminal block 11 to the lower electrical supply point 7 to the wire electrode 1 to the upper electrical supply point 6 to the E side of the upper terminal block 9 to the auxiliary capacitor 13 to the W side of the upper terminal block 9 to the workpiece 2 to the W side of the lower terminal block 11, and then back to the auxiliary electric discharging power supply 3. Furthermore, in parallel, the inter-electrode gap capacitance undergoes charging along a loop path extending from the auxiliary electric discharging power supply 3 to the E side of the lower terminal block 11 to the lower electrical supply point 7 to the wire electrode 1 to the workpiece 2 to the W side of the lower terminal block 11, and then back to the auxiliary electric discharging power supply 3.

Then, when the spark discharge occurs across the inter-electrode gap, electrical energy stored in the auxiliary capacitor 13 will flow, as the auxiliary electric discharging current, along a loop path extending from the auxiliary capacitor 13 to the E side of the upper terminal block 9 to the wire electrode 1 to the workpiece 2 to the W side of the upper terminal block 9, and then back to the auxiliary capacitor 13. Moreover, as with the foregoing charging loop path, the auxiliary electric discharging power supply 3 also supplies the auxiliary discharging current along a loop path extending from the auxiliary electric discharging power supply 3 to the E side of the lower terminal block 11 to the lower electrical supply point 7 to the wire electrode 1 to the workpiece 2 to the W side of the lower terminal block 11, and then back to the auxiliary electric discharging power supply 3.

As described in the foregoing, the current from the auxiliary electric discharging power supply flows through only the lower feeder 12, and the current from the auxiliary capacitor, through only the upper feeder 10. Thus, the current loop path is a low impedance path. This allows, immediately after the spark discharge has occurred, the auxiliary capacitor and the auxiliary electric discharging power supply to rapidly supply the auxiliary discharging current, thus making it hard for the discharge failure to occur, i.e., leading to stable machining operations.

It should be noted that the auxiliary capacitor 13 may be connected in parallel with the upper terminal block 9, as well as with the lower terminal block 11, i.e., the auxiliary electric discharging power supply 3. Alternatively, when there is a difference present between stray capacitance of the upper and lower feeders (e.g., the number of feeder wires differs), the auxiliary capacitor is provided at a terminal block having smaller stray capacitance as viewed from the inter-electrode gap, while the auxiliary electric discharging power supply 3 is connected to a terminal block having larger stray capacitance, whereby the auxiliary discharging current may be balanced. It is given that when an auxiliary capacitor is disposed at each of the upper terminal block 9 and the lower terminal block 11, there exists a difference, between the upper and lower electrical supply points, in occurrence of arc shortage and partial discharge due to mechanical elements and electrical elements. In this situation, an optimum auxiliary discharging current can be supplied across the inter-electrode gap by separately connecting each of auxiliary capacitors having mutually differing capacitance values, to the upper terminal block 9 and the lower terminal block 11. This allows stable machining operations to be performed.

When no auxiliary capacitor is used, the auxiliary discharging current is supplied only from one side (supplied only from the lower electrical supply point, in this embodiment), thus weakening the auxiliary discharging current. Simply stated, however, only this arrangement allows the main power supply independence to be maintained. Furthermore, with respect to wiring methods of the auxiliary electric discharging power supply, the connection of an auxiliary capacitor in parallel with the auxiliary electric discharging power supply can increase the amount of the auxiliary discharging current flowing from one side.

Embodiment 4

FIG. 6 is a diagram depicting a wire electric machining apparatus that is to be described in this embodiment. In the embodiment, the auxiliary electric discharging power supply 3 and the auxiliary capacitor 13 are connected to the upper terminal block 9 and the lower terminal block 11, respectively. Each impedance value of the associated wiring, however, is weighted. The auxiliary electric discharging power supply 3 is connected, for example, to the E side of the lower terminal block 11 and the W side of the upper terminal block 9 by low impedance wiring (shown in bold lines in the figure), and to the W side of the lower terminal block 11 and the E side of the upper terminal block 9 by high impedance wiring (shown in thin lines in the figure). Similarly, the auxiliary capacitor 13 is connected, for example, to the E side of the upper terminal block 9 and the W side of the lower terminal block 11 by low impedance wiring (shown in bold lines in the figure), and to the W side of the upper terminal block and the W side of the lower terminal block 11 by high impedance wiring (shown in thin lines in the figure). Impedance difference between wiring paths may result from either an L or R component.

If they are connected to the upper terminal block and the lower terminal block, the independence is likely to be lost through the wiring paths of the auxiliary electric discharging power supply and the auxiliary capacitor when only one of the main discharge power supplies operates. For example, when the upper main electric discharging power supply 4 is turned on and the lower main electric discharging power supply 5 is turned off, the main discharge current will be supplied from the upper electrical supply point 6, as well as from the lower electrical supply point 7, along a loop path extending from the upper main electric discharging power supply 4 to the E side of the upper terminal block 9 to the auxiliary electric discharging power supply 3 to the E side of the lower terminal block 11 and then back to the lower electrical supply point 7. In the embodiment, however, a path between the E side of the upper terminal 9 and the auxiliary electric discharging power supply 3 in the above-described loop path is constituted of high impedance wiring. For this reason, the power supply is designed so that the main discharging current is hard to flow, which allows independence of the main electric discharging power supply to be maintained.

Here, it may be conceivable that impedance values of the high impedance wiring including the L and R components are determined by a tradeoff with the loop path through which the main discharging current flows. In the foregoing, for instance, the main discharging current supplied from the upper main electric discharging power supply 4 flows along a loop path extending from the upper terminal block 9 to the upper feeder 10 to the upper electrical supply point 6 to the wire electrode 1 to the workpiece 2 to the upper feeder 10, and then back to the upper terminal block 9. Considering herein that the upper main electric discharging power supply 4 and the terminal block 9 each have remarkably low impedance, it may be conceivable that impedance of the upper feeder 10 would dominantly affect the loop path up to the upper electrical supply point. In other words, if a (loop) path has sufficiently high impedance in comparison with the upper feeder 10, it will serve as high impedance wiring. For instance, two or more times, preferably, 10 times as large as impedance Z in a bandwidth of 100 kHz through 10 MHz would adequately allow the independence of the main electric discharging power supply to be maintained.

In addition, the moment the spark discharge occurs, the auxiliary electric discharging power supply 3 supplies the auxiliary discharging current along a loop path extending from the auxiliary electric discharging power supply 3 to the E side of the lower terminal block 11 to the lower electrical supply point 7 to the wire electrode 1 to the workpiece 2 to the W side of the lower terminal block 11 (the W side of the upper terminal block 11), and then back to the auxiliary electric discharging power supply 3. At the same time, the auxiliary discharging current, albeit feeble, is supplied even along a loop path extending from the auxiliary electric discharging power supply 3 to the E side of the upper terminal block 9 to the upper electrical supply point 6 to the wire electrode 1 to the workpiece 2 to the W side of the upper terminal block 9 (the W side of the lower terminal block 11), and then back to the auxiliary electric discharging power supply 3. The auxiliary capacitor 13, as with the auxiliary electric discharging power supply 3, also supplies the auxiliary discharging current by two loop paths: an easy-to-flow current loop path, and a hard-to-flow current loop path. This causes the auxiliary discharging current to flow in balance across the inter-electrode gap, irrespective of discharge positions, which therefore contributes to the absence of partial discharge, thereby achieving stable machining operations.

In particular, the charging loop path extending from the auxiliary electric discharging power supply 3 to the auxiliary capacitor 13 includes, not limited to that shown in FIG. 1 (Embodiment 1), but another two loop paths (three loop paths, in total): one that extends from the auxiliary electric discharging power supply 3 to the E side of the upper terminal block 9 to the auxiliary capacitor 13 to the W side of the lower terminal block 11 (the W side of the upper terminal block 9), and then back to the auxiliary electric discharging power supply 3; and the other that extends from the auxiliary electric discharging power supply 3 to the E side of the lower terminal block 11 to the auxiliary capacitor 13 to the W side of the upper terminal block 9 (the W side of the lower terminal block 11), and then back to the auxiliary electric discharging power supply 3. That is to say, charge time of the auxiliary capacitor 13 using the auxiliary electric discharging power supply 3 will be made shorter than that in Embodiment 1, whereby the auxiliary discharging current is uniformly supplied from the auxiliary capacitor 13 even though a time from the turning-on of the auxiliary electric discharging power supply 3 to the start of the spark discharge is short. As a matter of course, the W sides of the upper terminal block 9 and the lower terminal block 11 may be connected in common with each other, and configured by a copper strip or the like, as is the case with Embodiment 1 through Embodiment 3

In this embodiment, changing the value of wire impedance maintains the independence of the main electric discharging power supply. Such a technique that simply provides ferrite cores to necessary places can achieve advantages in the foregoing as well. More specifically, by using identical cables (coaxial cables or twisted cables may be used), the output terminals of the auxiliary electric discharging power supply 3 are connected to the upper terminal block and the lower terminal block, respectively. The ferrite core, then, is fitted into only a circuit portion requiring high impedance, e.g., in the vicinity of a cable-to-terminal connecting portion. This arrangement can readily cause a difference in impedance values between wiring paths, with wiring length and cable type being equal to each other. As a result, with simple configurations, the stable machining operations can be achieved, and the independence of the main electric discharging power supply can be maintained.

INDUSTRIAL APPLICABILITY

As described thus far, the power supply circuit according to the present invention is applicable to wire electric discharge machining apparatuses.

What is claimed is:

1. A power supply circuit for a wire electric discharge machining apparatus, comprising:
   an auxiliary power supply which generates an auxiliary discharge by applying a voltage across a workpiece and a wire electrode;
   a plurality of main power supplies, a first one of which is electrically connected to an upper terminal block for connecting to an upper electrical supply point and a second one of which is electrically connected to a lower terminal block for connecting to a lower electrical supply point, in order to supplying a main discharging current after the auxiliary discharge from the auxiliary power supply has occurred; and
   an auxiliary capacitor which is connected to at least one of an upper terminal block or a lower terminal block,
   wherein the power supply circuit controls the auxiliary power supply and the main power supplies, to machine the workpiece, and a first output end and a second output end of the auxiliary power supply are connected to the upper terminal block and the lower terminal block, respectively.

2. The power supply circuit for a wire electric discharge machining apparatus as set forth in claim 1, wherein output ends to be connected to the workpiece, of the main power supplies are connected in common through a low impedance path.

3. A power supply circuit for a wire electric discharge machining apparatus comprising:
   an auxiliary power supply for generating an auxiliary discharge by applying a voltage across a workpiece and a wire electrode; and
   a plurality of main power supplies, a first one of which is electrically connected to an upper terminal block for connecting to an upper electrical supply point and a second one of which is electrically connected to a lower terminal block for connecting to a lower electrical supply point, in order to supplying a main discharging current after the auxiliary discharge from the auxiliary power supply has occurred,
   wherein the power supply circuit controls the auxiliary power supply and the main power supplies, to machine the workpiece, and a first output end and a second output end of the auxiliary power supply are connected to the upper terminal block and the lower terminal block, respectively, and
   wherein when the auxiliary power supply produces the auxiliary discharge, the power supply circuit is established such that an auxiliary discharging current flows along a loop path extending from the auxiliary power supply to the lower terminal block to the lower electrical supply point to the wire electrode to the workpiece, and then back to the upper terminal block, or such that an auxiliary discharging current flows along the loop path extending from the auxiliary power supply to the upper terminal block to the upper electrical supply point to the wire electrode to the workpiece, and then back to the lower terminal block.

4. The power supply circuit for a wire electric discharge machining apparatus as set forth in claim 3, wherein a first end of an auxiliary capacitor is connected to the upper terminal block and a second end of the auxiliary capacitor is connected to the lower terminal block.

5. The power supply circuit for a wire electric discharge machining apparatus as set forth in claim 4, wherein the auxiliary power supply charges the auxiliary capacitor along a loop path extending from the auxiliary power supply to the lower terminal block to the lower electrical supply point to the wire electrode to the upper electrical supply point to the upper terminal block to the auxiliary capacitor to the lower terminal block to the workpiece to the upper terminal block, and then back to the auxiliary power supply.

6. The power supply circuit for a wire electric discharge machining apparatus as set forth in claim 3, wherein an auxiliary capacitor is connected to either the upper terminal block or the lower terminal block.

7. The power supply circuit for a wire electric discharge machining apparatus as set forth in claim 6, wherein the auxiliary power supply charges the auxiliary capacitor along a loop path extending from the auxiliary power supply to the lower terminal block to the lower electrical supply point to the wire electrode to the upper electrical supply point to the upper terminal block to the auxiliary capacitor to the upper terminal block, and then back to the auxiliary power supply.

8. The power supply circuit for a wire electric discharge machining apparatus as set forth in claim 6, wherein the auxiliary power supply charges the auxiliary capacitor along a loop path extending from the auxiliary power supply to the lower terminal block to the auxiliary capacitor to the lower terminal block to the workpiece to the upper terminal block, and then back to the auxiliary power supply.

9. The power supply circuit for a wire electric discharge machining apparatus as set forth in claim 6, wherein the auxiliary capacitor is connected to both the lower terminal block and the upper terminal block.

10. The power supply circuit for a wire electric discharge machining apparatus as set forth in claim 3, wherein output ends to be connected to the workpiece, of the main power supplies are connected in common through a low impedance path.

11. A power supply circuit for a wire electric discharge machining apparatus, comprising:
an auxiliary power supply which generates an auxiliary discharge by applying a voltage across a workpiece and a wire electrode;
a plurality of main power supplies, a first one of which is electrically connected to an upper terminal block for connecting to an upper electrical supply point and a second one of which is electrically connected to a lower terminal block for connecting to a lower electrical supply point, in order to supplying a main discharging current after the auxiliary discharge from the auxiliary power supply has occurred;
wherein the power supply circuit controls the auxiliary power supply and the main power supplies, to machine the workpiece, and a first output end and a second output end of the auxiliary power supply are connected to the upper terminal block and the lower terminal block, respectively, and
wherein a first end of the auxiliary capacitor is connected to the upper terminal block and a second end of the auxiliary capacitor is connected to the lower terminal block.

12. The power supply circuit for a wire electric discharge machining apparatus as set forth in claim 11, wherein the auxiliary power supply charges the auxiliary capacitor along a loop path extending from the auxiliary power supply to the lower terminal block to the lower electrical supply point to the wire electrode to the upper electrical supply point to the upper terminal block to the auxiliary capacitor to the lower terminal block to the workpiece to the upper terminal block, and then back to the auxiliary power supply.

13. The power supply circuit for a wire electric discharge machining apparatus as set forth in claim 11, wherein main power supply output ends to be connected to the workpiece are connected in common through a low impedance path.

14. A power supply circuit for a wire electric discharge machining apparatus, comprising:
an auxiliary power supply which generates an auxiliary discharge by applying a voltage across a workpiece and a wire electrode;
a plurality of main power supplies, a first one of which is electrically connected to an upper terminal block for connecting to an upper electrical supply point and a second one of which is electrically connected to a lower terminal block for connecting to a lower electrical supply point, in order to supplying a main discharging current after the auxiliary discharge from the auxiliary power supply has occurred;
wherein the power supply circuit controls the auxiliary power supply and the main power supplies, to machine the workpiece, and a first output end and a second output end of the auxiliary power supply are connected to the upper terminal block and the lower terminal block, respectively, and
wherein the auxiliary capacitor is connected to either the upper terminal block or the lower terminal block.

15. The power supply circuit for a wire electric discharge machining apparatus as set forth in claim 14, wherein the auxiliary power supply charges the auxiliary capacitor along a loop path extending from the auxiliary power supply to the lower terminal block to the lower electrical supply point to the wire electrode to the upper electrical supply point to the upper terminal block to the auxiliary capacitor to the upper terminal block, and then back to the auxiliary power supply.

16. The power supply circuit for a wire electric discharge machining apparatus as set forth in claim 14, wherein the auxiliary power supply charges the auxiliary capacitor along a loop path extending from the auxiliary power supply to the lower terminal block to the auxiliary capacitor to the lower terminal block to the workpiece to the upper terminal block, and then back to the auxiliary power supply.

17. The power supply circuit for a wire electric discharge machining apparatus as set forth in claim 14, wherein the auxiliary capacitor is connected to both the lower terminal block and the upper terminal block.

18. A power supply circuit for a wire electric discharge machining apparatus, comprising:
an auxiliary power supply for generating an auxiliary discharge by applying a voltage across a workpiece and a wire electrode; and
a plurality of main power supplies, a first one of which electrically connected to an upper terminal block for connecting to an upper electrical supply point, and a second one of which electrically connected to a lower terminal block for connecting to a lower electrical supply point, in order to supply a main discharging current after the auxiliary discharge has occurred;
wherein the power supply circuit for a wire electric discharge machining apparatus controls the auxiliary power supply and the main power supplies, to machine the workpiece, and the auxiliary power supply and an auxiliary capacitor are connected to an upper terminal block and a lower terminal block, respectively, or to the lower terminal block and the upper terminal block, respectively, with the auxiliary power supply and the auxiliary capacitor each being connected in parallel with the respective main power supplies.

19. The power supply circuit for a wire electric discharge machining apparatus as set forth in claim 18, wherein, by using cables having a mutually-differing wiring impedance, a first output end of the auxiliary power supply is connected to the upper terminal block and a second output end of the auxiliary power supply is connected to the lower terminal block.

20. The power supply circuit for a wire electric discharge machining apparatus as set forth in claim 19, wherein the impedance difference between the wiring cables results from using a ferrite core.

* * * * *